United States Patent
Zhang et al.

(10) Patent No.: US 9,730,083 B2
(45) Date of Patent: Aug. 8, 2017

(54) METHOD AND APPARATUS FOR THREE-DIMENSIONAL BEAMFORMING

(75) Inventors: Yu Zhang, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 168 days.

(21) Appl. No.: 14/384,449

(22) PCT Filed: Jun. 8, 2012

(86) PCT No.: PCT/CN2012/076667
§ 371 (c)(1),
(2), (4) Date: Dec. 19, 2014

(87) PCT Pub. No.: WO2013/181850
PCT Pub. Date: Dec. 12, 2013

(65) Prior Publication Data
US 2015/0105025 A1    Apr. 16, 2015

(51) Int. Cl.
*H04B 1/00* (2006.01)
*H04B 15/00* (2006.01)
(Continued)

(52) U.S. Cl.
CPC ............ *H04W 16/28* (2013.01); *H01Q 1/246* (2013.01); *H01Q 3/26* (2013.01); *H04B 7/0408* (2013.01); *H04B 7/0413* (2013.01); *H04B 7/0426* (2013.01); *H04B 7/0447* (2013.01); *H04B 7/0456* (2013.01); *H04B 7/0465* (2013.01); *H04B 7/063* (2013.01); *H04B 7/0617* (2013.01); *H04B 7/0626* (2013.01); *H04B 7/0632* (2013.01); *H04B 7/0639* (2013.01);
(Continued)

(58) Field of Classification Search
CPC ... H04W 16/28; H04B 7/0617; H04B 7/0408; H04B 7/0632; H04L 1/06; H01Q 1/246
USPC ......................................... 455/63.4
See application file for complete search history.

(56) References Cited

U.S. PATENT DOCUMENTS

| 7,236,808 B2 | 6/2007 | Goldberg |
| 2007/0249405 A1 | 10/2007 | Goldberg |
| 2012/0129575 A1 | 5/2012 | Kenington |

FOREIGN PATENT DOCUMENTS

| CN | 1682453 A | 10/2005 |
| EP | 2385635 A2 | 11/2011 |

(Continued)

OTHER PUBLICATIONS

International Search Report for PCT/CN2012/076667 dated Mar. 14, 2013.
(Continued)

*Primary Examiner* — Eugene Yun
(74) *Attorney, Agent, or Firm* — Sughrue Mion, PLLC

(57) ABSTRACT

Embodiments of the disclosure provide methods and apparatuses for three-dimensional beamforming. The method may comprise: mapping vertical virtual antenna ports to physical antenna ports based on vertical reference signals to obtain mapped vertical reference signals; transmitting the mapped vertical reference signals to a user equipment; receiving a tilting indicator from the user equipment, wherein the tilting indicator is obtained based on the mapped vertical reference signals at the user equipment; determining a tilting vector based on the received tilting indicator, wherein the tilting vector indicates adjustment for traffic data in antenna vertical tilting; and adjusting traffic data with the tilting vector.

14 Claims, 7 Drawing Sheets

(51) Int. Cl.

| | | |
|---|---|---|
| *H04W 16/28* | (2009.01) | |
| *H01Q 3/26* | (2006.01) | |
| *H01Q 1/24* | (2006.01) | |
| *H04B 7/0408* | (2017.01) | |
| *H04B 7/0426* | (2017.01) | |
| *H04B 7/04* | (2017.01) | |
| *H04B 7/0456* | (2017.01) | |
| *H04B 7/06* | (2006.01) | |
| *H04B 7/0413* | (2017.01) | |
| *H04L 1/00* | (2006.01) | |
| *H04L 1/06* | (2006.01) | |

(52) U.S. Cl.
CPC ........... *H04B 15/00* (2013.01); *H04L 1/0003* (2013.01); *H04L 1/0009* (2013.01); *H04L 1/06* (2013.01)

(56) References Cited

FOREIGN PATENT DOCUMENTS

| JP | 2004-80353 A | 3/2004 |
|---|---|---|
| JP | 2008-312247 A | 12/2008 |

OTHER PUBLICATIONS

Written Opinion for PCT/CN2012/076667 dated Mar. 14, 2013.
Communication dated Sep. 6, 2015 from the State Intellectual Property Office of the P.R.C. issued in corresponding Application No. 201280071948.5.
Communication dated Mar. 24, 2016 from the State Intellectual Property Office of the P.R.C. issued in corresponding Application No. 201280071948.5.
Communication dated Nov. 10, 2015 from the Japanese Patent Office in counterpart application No. 2015-511890.
Communication dated Nov. 17, 2015 from the European Patent Office in counterpart application No. 12878448.5.
Alcatel-Lucent Shanghai Bell et al: "Considerations on CSI feedback enhancements for high-priority antenna configurations", 3GPP TSG-RAN WG1 #66; R1-112420, Athens, Greece; Aug. 22-26, 2011 XP050537814.
Ericsson: "On VAM for 4-branch MIMO", 3GPP TSG-RAN WG1 #69; R1-122817; Prague, Czech Republic; May 21-25, 2012, XP050600994.

400

Start

S401 receive mapped vertical reference signals from a base station

S402 obtain vertical channel information based on the mapped vertical reference signals S403 determine a tilting vector based on the vertical channel information S404 send the tilting indicator indicating the tilting vector to the base station End

METHOD AND APPARATUS FOR THREE-DIMENSIONAL BEAMFORMING

FIELD OF THE INVENTION

Embodiments of the present invention generally relate to communication techniques. More particularly, embodiments of the present invention relate to a method and apparatus for three-dimensional beamforming.

BACKGROUND OF THE INVENTION

Generally, wireless communications systems using beamforming utilize a number of transmit and/or receive antennas and signal processing to create fixed or adaptive transmit and/or receive beam patterns. The beam patterns may have a directional nature that results in a performance improvement when compared with unidirectional transmit and/or receive antennas. The use of beam patterns may yield a transmit/receive gain over wireless communications systems using unidirectional transmit and/or receive antennas. Beamforming therefore may help increase cell coverage and improve cell edge spectral efficiencies.

According to an existing beamforming solution, a fixed downward tilting angle is generally provided in the vertical direction, i.e., providing a fixed beam in the vertical direction for each user equipment (UE) in a cell. Such a solution fixes a beamforming weight in the vertical direction, leading to a finer and narrower beam in the vertical direction, thus it may reduce the interference with neighboring cells and enhance system throughput to a certain extend.

However, although the solution of fixed down tilting angle may improve cell throughput to a certain extent, a major lobe of the radiation pattern of an antenna may only be directed to a UE in a certain direction within the cell, but for other UE(s) deviating from the certain direction, the receiving power(s) will be significantly decreased. Further, the solution with a fixed beam in the vertical direction may have negative effect on beam scheduling and interference coordination between neighboring cells in the vertical direction.

In view of the foregoing problem, there is a need to find a solution of three-dimensional (3D) beamforming to adjust the vertical direction of a beam while adjusting the horizontal direction of the beam, so as that the beam effectively tracks a UE in both the vertical direction and the horizontal direction.

SUMMARY OF THE INVENTION

The present invention proposes a solution for three-dimensional beamforming. Specifically, the present invention provides a method and apparatus for 3D beamforming, which may effectively track a UE in both the vertical direction and the horizontal direction.

According to a first aspect of embodiments of the present invention, embodiments of the invention provide a method for three-dimensional beamforming. The method may comprise: mapping vertical virtual antenna ports to physical antenna ports based on vertical reference signals (RSs) to obtain mapped vertical reference signals; transmitting the mapped vertical reference signals to a user equipment; receiving a tilting indicator from the user equipment, wherein the tilting indicator is obtained based on the mapped vertical reference signals at the user equipment; determining a tilting vector based on the received tilting indicator, wherein the tilting vector indicates adjustment for traffic data in antenna vertical tilting; and adjusting traffic data with the tilting vector.

According to a second aspect of embodiments of the present invention, embodiments of the invention provide a method for three-dimensional beamforming. The method may comprise: receiving mapped vertical reference signals (RSs) from a base station; obtaining vertical channel information based on the mapped vertical reference signals; determining a tilting vector based on the vertical channel information, wherein the tilting vector indicates adjustment for traffic data in antenna vertical tilting; and sending the tilting indicator indicating the tilting vector to the base station.

According to a third aspect of embodiments of the present invention, embodiments of the invention provide an apparatus for three-dimensional beamforming. The apparatus may comprise: vertical mapping unit configured to map vertical virtual antenna ports to physical antenna ports based on vertical reference signals (RS) to obtain mapped vertical reference signals; vertical RS transmitting unit configured to transmit the mapped vertical reference signals to a user equipment; first receiving unit configured to receive a tilting indicator from the user equipment, wherein the tilting indicator is obtained based on the mapped vertical reference signals at the user equipment; first determining unit configured to determine a tilting vector based on the received tilting indicator, wherein the tilting vector indicates adjustment for traffic data in antenna vertical tilting; and adjusting unit configured to adjusting traffic data with the tilting vector.

According to a fourth aspect of embodiments of the present invention, embodiments of the invention provide an apparatus for three-dimensional beamforming. The apparatus may comprise: first receiving unit configured to receive mapped vertical reference signals (RSs) from a base station; first obtaining unit configured to obtain vertical channel information based on the mapped vertical reference signals; first determining unit configured to determine a tilting vector based on the vertical channel information, wherein the tilting vector indicates adjustment for traffic data in antenna vertical tilting; and first sending unit configured to send the tilting indicator indicating the tilting vector to the base station.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where

FIG. 4 illustrates a flow chart of a method 400 for performing 3D beamforming according to embodiments of the invention;

Throughout the figures, same or similar reference numbers indicate same or similar elements.

DETAILED DESCRIPTION OF EMBODIMENTS

Figure 1A:
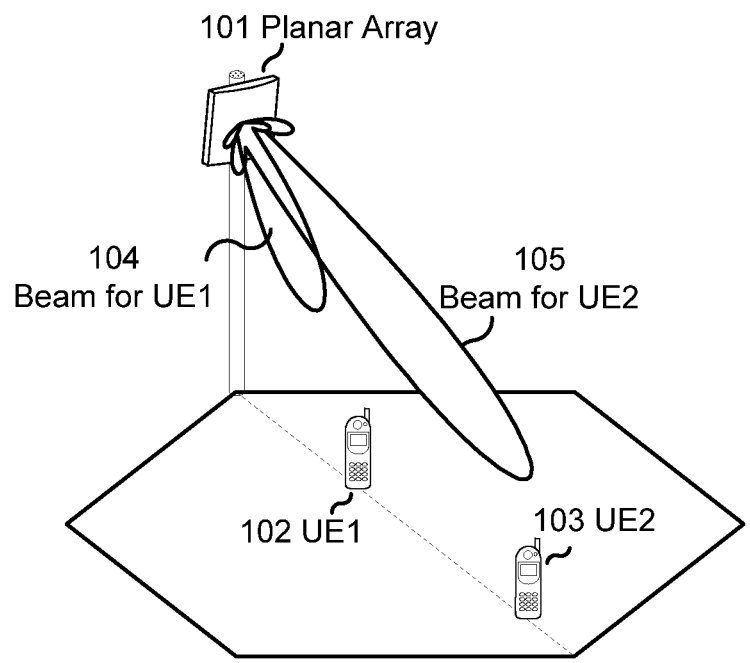
FIG. 1A illustrates a schematic diagram of 3D beamforming according to embodiments of the invention.

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

The present invention will be described with respect to embodiments in specific contexts, such as the Third Generation Partnership Project (3GPP) Long Term Evolution (LTE) and wireless cellular networks. The present invention also may be applied, however, to other wireless communications systems, such as the 3GPP LTE-Advanced, the Worldwide Interoperability for Microwave Access (Wi-MAX), the Universal Mobile Telecommunications System (UMTS), as well as other wireless communications systems.

In such wireless communication systems, a user equipment (UE) may be a terminal, a Mobile Terminal (MT), a Subscriber Station (SS), a Portable Subscriber Station (PSS), Mobile Station (MS), an Access Terminal (AT), or an overlay low power node (including the pico-cell base station, the relay station, femto-cell base station) within the coverage of the base station, and some or all of the functions of the UE, the terminal, the MT, the SS, the PSS, the MS, or the AT may be included. A base station (BS) may be a base station transceiver (BTS), an access point (AP), an access network (AN), a node B (NodeB or NB), an evolved NodeB (eNodeB or eNB), or any other suitable device.

In a wireless cellular network, 3D beamforming may provide antenna vertical tilting at a base station. Generally, 3D beamforming allows the generation of antenna beams having different main-lobe pointing angles in the vertical plane. Generally, antenna vertical tilting assists in controlling the coverage of a base station and the interference between neighboring base stations. Increasing the vertical tilting of the base station antenna generally reduces the coverage footprint of the cell as well as interference to and from neighboring cells. The capacity/throughput of a cell for data services may be to a large extent determined by the level of interference between the users within the cell (intra-cell interference) and from neighboring cells (inter-cell interference).

3D beamforming may be used to provide user-specific antenna vertical tilting for a BS. By tailoring the tilt angle of a high power data signal for a particular UE in a cell, the UE may receive a stronger signal from the BS. In addition, the interference to other UEs in the cell or in the neighboring cells may be reduced, enhancing the overall signal to interference ratio for the UEs, and therefore enhancing the throughput and capacity of the system. The effect may be especially pronounced for UEs at the cell edges, because they suffer more severely from interference from neighboring cells.

Reference is first made to FIG. 1A, which illustrates a schematic diagram of 3D beamforming according to embodiments of the invention. In the embodiments, a BS manages a cell, and there are two UEs, i.e., UE1 102 and UE2 103, in the cell. The BS has a planar array 101, through which two beams are emitted, i.e., beam 104 for UE1 and beam 105 for UE2. The two beams are generated according to methods for performing 3D beamforming of the present invention. In particular, the vertical direction of the beam 104 for UE1 may be adjusted in antenna vertical tilting with respect to UE1 102, and the vertical direction of the beam 105 for UE2 may be adjusted in antenna vertical tilting with respect to UE2 103.

Figure 1B:
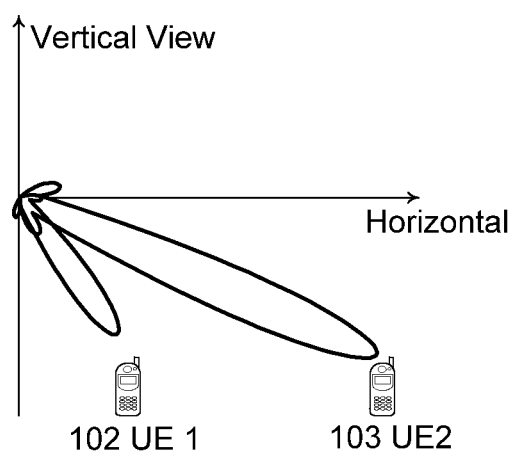
FIG. 1B illustrates a schematic diagram of vertical view of the 3D beamforming according to embodiments of the invention.

FIG. 1B illustrates a schematic diagram of vertical view of the 3D beamforming shown in FIG. 1A according to embodiments of the invention. It is seen that in the vertical view, the beam for UE1 102 and the beam for UE2 103 are different, because the adjustment to vertical direction of the beam for UE1 in antenna vertical tilting is different from the adjustment to vertical direction of the beam for UE2 in antenna vertical tilting.

FIG. 1A and FIG. 1B illustrates the user-specific antenna vertical tilting provided by the 3D beamforming according to embodiments of the present invention. By tailoring the tilt angle of traffic data for UE1 and UE2 in the cell respectively, the UE1 and the UE2 may respectively receive stronger signals from the BS.

It is to be noted that, according to other embodiments of the present invention, a cell in a communication system may comprise one or more UEs in communication with a BS. Thus, there may be several UEs in the cell as shown in FIGS. 1A and 1B. The UE1 102 and the UE2 103 shown in FIGS. 1A and 1B are only for example, not for limitation.

Figure 2:
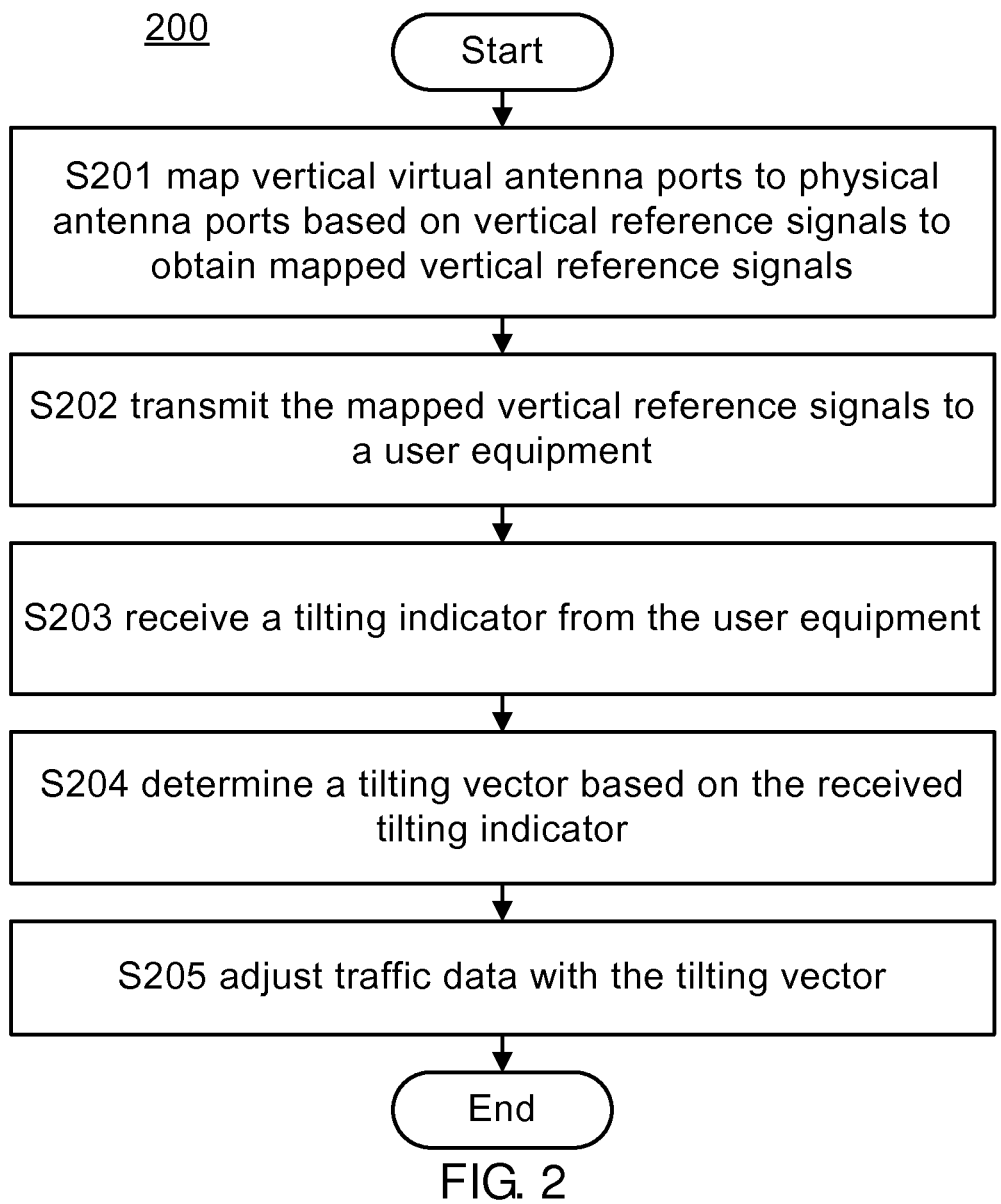
FIG. 2 illustrates a flow chart of a method 200 for performing 3D beamforming according to embodiments of the invention.

Reference is now made to FIG. 2, which illustrates a flow chart of a method 200 for performing 3D beamforming according to embodiments of the invention. According to embodiments of the present invention, the communication system for performing 3D beamforming may be a UMTS system, a LTE system, etc. In accordance with embodiments of the present invention, the method 200 may be carried out by, for example, a transmitter, a base station, a base station controller (BSC), a gateway, a relay, a server, or any other applicable device.

After method 200 starts, at step S201, vertical virtual antenna ports are mapped to physical antenna ports based on vertical reference signals to obtain mapped vertical reference signals.

In accordance to embodiments of the present invention, the mapped vertical reference signals may be obtained based on the vertical reference signals and predefined vertical virtualization weight. In some embodiments, the vertical virtualization weights may be selected such that the half-power beam width of each vertical virtual antenna port is maximized.

After mapping the vertical virtual antenna ports to the physical antenna ports, the mapped vertical reference signals may be transmitted from the base station to a UE to obtain a tilting indicator. This step is shown in step S202, wherein the mapped vertical reference signals are transmitted to the UE. The UE may be a particular UE (e.g., UE1 102 as shown in FIG. 1A) served by a BS in a cell, and the beam for the UE (e.g., beam 104 for UE1) may be adjusted in antenna vertical tilting. According to embodiments of the present invention, after receiving the mapped vertical reference signals, the UE may determine a tilting vector indicating adjustment for traffic data in antenna vertical tilting and send a tilting indicator may indicate the determined tilting vector to the BS. Thus, at step S203, a tilting indicator is received from the user equipment. Then, a tilting vector is determined based on the received tilting indicator at step S204. At step S205, traffic data is adjusted with the tilting vector. After the adjustment, the antenna vertical tilting has been performed; accordingly, the vertical beam has been adjusted with respect to the particular UE, e.g., UE1 102.

In accordance to embodiments of the present invention, besides steps S201-S205, the method as illustrated in FIG. 2 may further comprise steps of: mapping horizontal virtual antenna ports to physical antenna ports based on horizontal reference signals to obtain mapped horizontal reference signals; and transmitting the mapped horizontal reference signals to a user equipment. In some embodiments, the transmission of the mapped vertical reference signals may be in orthogonal to the transmission of the mapped horizontal reference signals. In some embodiments, the transmissions of the mapped vertical reference signals corresponding to respective vertical virtual antenna ports are orthogonal, and the transmissions of the mapped horizontal reference signals corresponding to respective horizontal virtual antenna ports are orthogonal. According to embodiments of the present invention, the orthogonality may be achieved through frequency division multiplexing (FDM), time division multiplexing (TDM), code division multiplexing (CDM), and/or other suitable technologies in the art. It is to be noted that the above examples are described for illustration, not for limitation.

In accordance to embodiments of the present invention, besides steps S201-S205, the method as illustrated in FIG. 2 may further comprise steps of: receiving a channel quality indicator from the user equipment; obtaining a channel quality measure based on the received channel quality indicator; and selecting a modulation and coding scheme for traffic data transmission based on the channel quality measure. In some embodiments, during the selection of a modulation and coding scheme for traffic data transmission, a candidate channel quality measure may be calculated based on the predefined horizontal virtualization weights, the obtained channel quality measure and the tilting vector; the channel quality measure may be updated with the candidate channel quality measure; and a modulation and coding scheme for traffic data transmission may be determined based on the updated channel quality measure.

Figure 3:
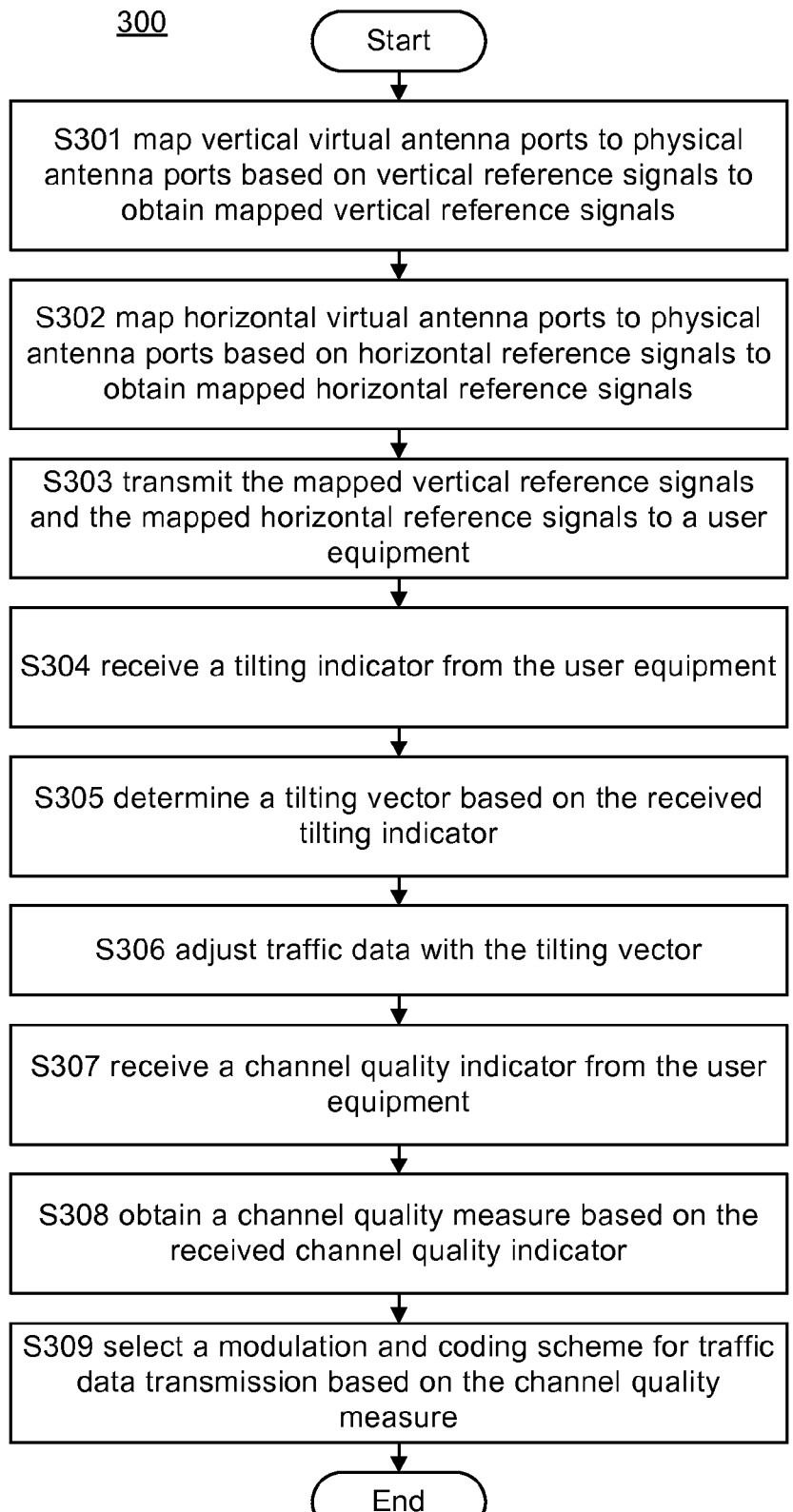
FIG. 3 illustrates a flow chart of a method 300 for performing 3D beamforming according to embodiments of the invention.

Reference is now made to FIG. 3, which illustrates a flow chart of a method 300 for performing 3D beamforming according to embodiments of the invention. Method 300 may be considered as an embodiment of method 200 described above with reference to FIG. 2. In the following description of method 300, optionally, mapped horizontal reference signals are optionally obtained and transmitted to the UE and traffic data may be optionally encoded and modulated with a modulation and coding scheme (MCS) selected based on channel quality measure fed back from the UE. However, it is noted that this is only for the purpose of illustrating the principles of the present invention, rather than limiting the scope thereof.

After method 300 starts, at step S301, vertical virtual antenna ports are mapped to physical antenna ports based on vertical reference signals to obtain mapped vertical reference signals.

According to embodiments of the present invention, a physical antenna port, also called as antenna port (AP) for brief, may comprise one or more physical antenna elements. For a virtual antenna port (VAP), there may be two types, one is horizontal VAP and the other is vertical VAP. For example, if P-by-Q antenna ports are configured, then there may be P vertical VAPs and Q horizontal VAPs. The mapping of vertical VAPs to APs may be done in several ways. In embodiments of the present invention, the mapped vertical reference signals may be obtained based on the vertical reference signals and predefined vertical virtualization weight. For example, the mapping may be done by multiplying the reference signal associated with the vertical VAP by the predefined vertical virtualization weight.

It is to be noted that in the disclosure, "a reference signal (RS)" may refer to a reference signal sequence. That is to say, in embodiments of the present invention, a reference signal may be a sequence of reference signals or a reference signal sequence, and reference signals may be several sequences of reference signals or several reference signal sequences.

With respect to a vertical VAP, there may be a vertical reference signal sequence associated with it. Denote the vertical reference signal sequence associated to the pth vertical VAP as $a_V^{(p)}(0), a_V^{(p)}(1), \ldots, a_V^{(p)}(N_V-1)$, $p=0, 1, \ldots, P-1$, the mapping may be given by $$a_V^{(p,q)} = w_V^{(q)} a_V^{(p)}(i), \quad (1)$$

where $q=0, 1, \ldots, Q-1$; $i=0, 1, \ldots, N_V-1$; $w_V = [w_V^{(0)} \ w_V^{(1)} \ \ldots \ w_V^{(Q-1)}]^T$ is a predefined vertical virtualization weight; $N_V$ is the length of the vertical reference signal sequence; P is the total number of the vertical reference signals.

The vertical virtualization weight may depend on the radiation pattern of the antenna elements. According to embodiments of the present invention, the vertical virtualization weights may be selected such that the half-power beam width (HPBW) of each vertical virtual antenna port is maximized. For example, for a 4-by-4 AP configuration with antenna elements with 40° vertical HPBW, the vertical virtualization weight could be $$w_v = \frac{1}{2} [1 \ e^{-j5\pi/8} \ e^{-j5\pi/8} \ 1]^T. \quad (2)$$

At step S302, horizontal virtual antenna ports are mapped to physical antenna ports based on horizontal reference signals to obtain mapped horizontal reference signals.

Similar to the mapping of the vertical virtual antenna port to the physical antenna ports, the mapping horizontal VAPs to APs may also be done in several ways. In embodiments of the present invention, the mapped horizontal reference signals may be obtained based on the horizontal reference signals and predefined horizontal virtualization weight. For example, the mapping may be done by multiplying the reference signal associated with the horizontal VAP by the predefined horizontal virtualization weight.

With respect to a horizontal VAP, there may be a horizontal reference signal sequence associated with it. Denote the horizontal reference signal sequence associated to the qth horizontal VAP as $a_H^{(q)}(0), a_H^{(q)}(1), \ldots, a_H^{(q)}(N_H-1)$, $q=0, 1, \ldots, Q-1$, the mapping may be given by $$a_H^{(p,q)} = w_H^{(p)} a_H^{(q)}(i), \quad (3)$$

where $p=0, 1, \ldots, P-1$; $i=0, 1, \ldots, N_H-1$; $w_H = [w_H^{(0)} \ w_H^{(1)} \ \ldots \ w_H^{(P-1)}]^T$ is a predefined horizontal virtualization weight; $N_H$ is the length of the horizontal reference signal sequence; and Q is the total number of the horizontal reference signals.

Similarly, the horizontal virtualization weight may depend on the radiation pattern of the antenna elements. According to embodiments of the present invention, the horizontal virtualization weights may be selected such that the half-power beam width (HPBW) of each horizontal virtual antenna port is maximized. For example, for a 4-by-4 AP configuration with antenna elements with 120° horizontal HPBW, the horizontal virtualization weight could be $$w_H = \frac{1}{2} [1 \ e^{-j3\pi/4} \ e^{-j3\pi/4} \ 1]^T. \quad (4)$$

The mapped VAP reference signal sequences $\{a_H^{(p,q)}(i): i=0,1,\ldots,N_H-1\}$ and $\{a_V^{(p,q)}(i):i=0,1,\ldots,N_V-1\}$ may be mapped to the resource elements (REs) allocated for the (p, q)th AP. The REs occupied by the pth vertical VAP and by the qth horizontal VAP should be orthogonal, so that interference there between may be effectively reduced. The orthogonality may be achieved through FDM, TDM, CDM, and so on.

In some embodiments, the transmissions of the mapped vertical reference signals corresponding to respective vertical virtual antenna ports are orthogonal. Thus, the REs occupied by the mapped vertical reference signal corresponding to one of the vertical virtual antenna ports are orthogonal to those occupied by the mapped vertical reference signal corresponding to other vertical virtual antenna ports.

In some other embodiments, the transmissions of the mapped horizontal reference signals corresponding to respective horizontal virtual antenna ports are orthogonal. Thus, the REs occupied by the mapped horizontal reference signal corresponding to one of the horizontal virtual antenna ports are orthogonal to those occupied by the mapped horizontal reference signal corresponding to other horizontal virtual antenna ports.

At step S303, the mapped vertical reference signals and the mapped horizontal reference signals are transmitted to a user equipment.

As mentioned above, the transmissions of the mapped horizontal reference signals corresponding to respective horizontal virtual antenna ports may be orthogonal. In embodiments of the present invention, the transmission of the mapped vertical reference signals and the transmission of the mapped horizontal reference signals are configured with TDM scheme. In particular, the mapped vertical reference signals and the mapped horizontal reference signals may be assigned to the same group of REs alternatively. Let $n_V$ denotes the transmission period of the mapped vertical reference signals, and $n_{offset}$ denotes the offset of the mapped horizontal RSs transmission, wherein $n_{offset}=0, 1, \ldots, n_V-1$. At the subframe $n=l+kn_V+n_{offset}$, wherein $k=0, 1, \ldots$; $l=0, 1, \ldots, n_V-2$, some REs may be assigned to the mapped horizontal RSs. At the subframe $n=(k+1)n_V+n_{offset}-1$, the same REs may be assigned to the mapped vertical RSs. Both the mapped vertical RSs transmission interval $n_V$ and the mapped horizontal RSs transmission offset $n_{offset}$ may be semi-statically configured by higher-layer or by, e.g., an operator, a provider, a vendor, etc.

After resources, such as subcarriers or REs, being assigned to the mapped vertical reference signals and the mapped horizontal reference signals, these mapped RSs may be transmitted from the BS to the UE by utilizing the assigned resources.

At step S304, a tilting indicator is received from the user equipment.

As discussed above, the UE may be a particular UE (e.g., UE1 102 as shown in FIG. 1A) served by a BS in a cell, and the beam for the UE (e.g., beam 104 for UE1) may be adjusted in antenna vertical tilting. After receiving the mapped vertical reference signals, the UE may determine a tilting vector indicating adjustment for traffic data in antenna vertical tilting. Then, the UE may select a codeword which is most approximate to the tilting vector out of a predetermined tilting codebook which describes the vertical tilting direction. Next, the UE may determine the index of the selected codeword as a tilting indicator, and send the tilting indicator to the BS. As such, the BS may receive the tilting indicator from the user equipment.

At step S305, a tilting vector is determined based on the received tilting indicator.

According to embodiments of the present invention, the predetermined tilting codebook may be known by both the BS and the UE. It may be determined from the predetermined tilting codebook a codeword corresponding to the received tilting indicator, that is, the tilting vector. It is to be noted that, since the tilting vector determined at step S305 is a codeword in the predetermined tilting codebook, it may be an estimation of the actual tilting vector determined at the UE.

At step S306, traffic data is adjusted with the tilting vector.

The tilting vector indicates the adjustment for traffic data in antenna vertical tilting. Thus, after determining the tilting vector, the traffic data may be adjusted with the determined tilting vector. In this regard, the vertical beam for the UE may be adjusted accordingly.

At step S307, a channel quality indicator is received from the user equipment.

A channel quality indicator (CQI) is a measurement of the communication quality of wireless channels. CQI may be a value (or values) representing channel quality measure for a given channel. The channel quality measure may indicate quality of the channel between the base station and the user equipment. Typically, a high value CQI is indicative of a channel with high quality and vice versa. In embodiments of the present invention, the UE may obtain the CQI by using existing technical means or in known ways. A CQI for a channel can be computed by making use of performance metric, such as a signal-to-noise ratio (SNR), signal-to-interference plus noise ratio (SINR), signal-to-noise plus distortion ratio (SNDR), and so forth of the channel. These values and others may be measured for a given channel and then used to compute a CQI for the channel. The CQI for a given channel can be dependent upon the transmission/modulation scheme, e.g., MCS used by the communications system.

It is to be noted that, in the case that the communications system employing spatial multiplexing, there may be a plurality of channels between the BS and the UE. As such, there may be the plurality of CQIs fed back from the UE. That is, at that time, the CQIs may be a CQI sequence, rather than one CQI.

At step S308, a channel quality measure is obtained based on the received channel quality indicator.

According to some embodiments of the present invention, based on the received channel quality indicator, it may be obtained the channel quality measure, such as SINR, SNR, SNDR, etc. associated with one channel between the BS and the UE. For the communications system employing spatial multiplexing, the channel quality measure may be denoted as $\gamma_k$ which indicates the SINR associated with the kth channel.

According to some other embodiments of the present invention, the obtained channel quality measure may have been adjusted by the tilting vector at the UE. In an embodiment, the UE may receive predefined horizontal virtualization weights from the base station, calculate a candidate channel quality measure (denoted as $\gamma_k'$) based on the predefined horizontal virtualization weights, the obtained channel quality measure and the tilting vector, and update the channel quality measure $\gamma_k$ with the candidate channel quality measure $\gamma_k'$. In such embodiment, the channel quality measure obtained based on the received channel quality indicator at step S308 may be $\gamma_k'$.

At step S309, a modulation and coding scheme is selected for traffic data transmission based on the channel quality measure.

In accordance to some embodiments of the present invention, the channel quality measure obtained based on the received channel quality indicator at step S308 is $\gamma_k'$. Then, a MCS may be selected according to the channel quality measure $\gamma_k'$. The selection of the MCS may be implemented in several existing ways in the art, so details are not discussed here.

In accordance to some other embodiments of the present invention, the channel quality measure obtained based on the received channel quality indicator at step S308 is $\gamma_k$. During selection of the modulation and coding scheme or MCS, the channel quality measure $\gamma_k$ may be optimized first and then be used in the selection of the MCS, so that the selected MCS may be more suitable for the traffic data transmission. In some embodiments, the channel quality measure $\gamma_k$ may be updated by a candidate channel quality measure $\gamma_k'$ which may be calculated based on the predefined horizontal virtualization weights, the obtained channel quality measure and the tilting vector; and then the MCS may be determined based on the updated channel quality measure. For example, the candidate channel quality measure $\gamma_k'$ may be calculated by $$\gamma_k' = \frac{\gamma_k}{|w_H^T f_V|^2}, \quad (5)$$

wherein, $w_H$ is the predefined horizontal virtualization weight; and $f_V$ is the codeword selected from the predetermined tilting codebook, which is an estimation of the actual tilting vector determined at the UE.

As can be appreciated by those skilled in the art, the aforesaid steps S307 to S309 are optional steps for the method according to the present invention. In a case that a modulation and coding scheme is fixed during the 3D beamforming, without steps S307 to S309, the method for performing 3D beamforming according to the present invention may also work.

In accordance to embodiments of the present invention, the present invention is applicable for a communication system employing spatial multiplexing. For such a communication system, a plurality of beams may be emitted from the BS to a particular UE, and the UE may obtain the plurality of channel quality measures with respect to the plurality of beams and fed them back to the BS. The BS may select the plurality of MCSs based on the plurality of channel quality measures and use the MCSs to modulate traffic data to be transmitted in the plurality of beams to the UE.

Reference is now made to FIG. 4, which illustrates a flow chart of a method 400 for performing 3D beamforming according to embodiments of the invention. According to embodiments of the present invention, the communication system for performing 3D beamforming may be a UMTS system, a LTE system, etc. In accordance with embodiments of the present invention, the method 400 may be carried out by, for example, a receiver, a user equipment, a terminal or any other applicable device.

After method 400 starts, at step S401, mapped vertical reference signals are received from a base station. Based on the mapped vertical reference signals, vertical channel information is obtained at step S402. In accordance to embodiments of the present invention, the vertical channel information may be obtained by: obtaining vertical reference signals, which is the same as those used in mapping vertical virtual antenna ports to physical antenna ports at the base station; and estimating the vertical channel information based on the mapped vertical reference signals and the vertical reference signals. At step S403, a tilting vector is determined based on the vertical channel information. The tilting vector may indicate adjustment for traffic data in antenna vertical tilting. Then, a codeword which is most approximate to the tilting vector may be selected from a predetermined tilting codebook, and the index of the selected codeword may be determined as a tilting indicator. At step S404, the tilting indicator indicating the tilting vector is sent to the base station. In embodiments of the present invention, the tilting indicator may be a Precoding Matrix Indicator (PMI), which may be reported from the UE to the BS periodically or aperiodically via uplink control channels, e.g., Physical Uplink Control Channel (PUCCH) or Physical Uplink Shared Channel (PUSCH) in LTE or LTE-Advanced.

In accordance to embodiments of the present invention, besides step S401-S404, the method 400 may further comprise steps of: receiving mapped horizontal reference signals from the base station; obtaining horizontal channel information based on the mapped horizontal reference signals; determining a channel quality measure based on the horizontal channel information, wherein the channel quality measure indicates quality of the channel between the base station and the user equipment; and sending a channel quality indicator indicating the channel quality measure to the base station. In embodiments according to the present invention, during the determination of the channel quality measure, predefined horizontal virtualization weights may be received from the base station; a candidate channel quality measure may be calculated based on the predefined horizontal virtualization weights, the obtained channel quality measure and the tilting vector; and the channel quality measure may be updated with the candidate channel quality measure.

Figure 5:
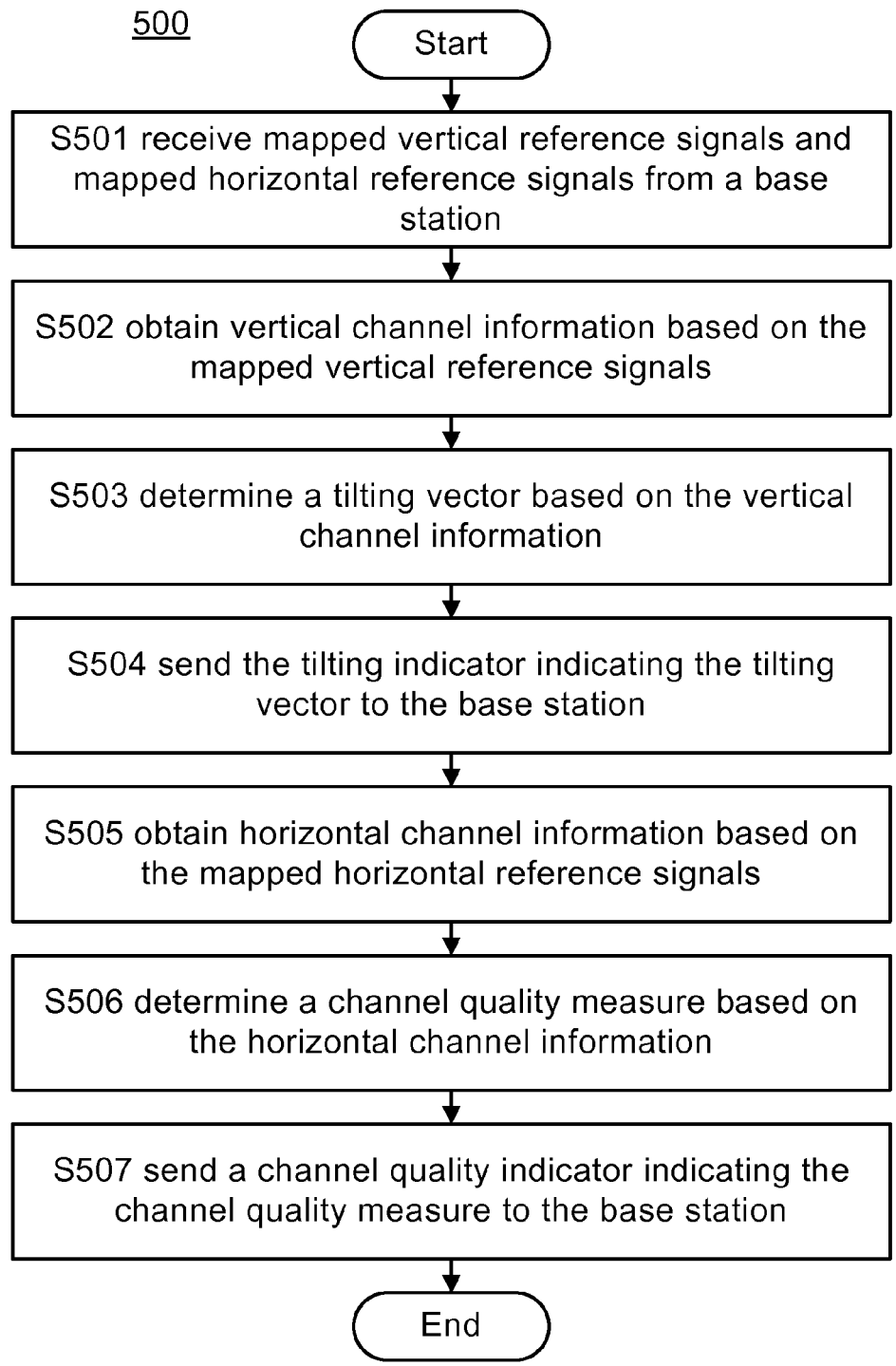
FIG. 5 illustrates a flow chart of a method 500 for performing 3D beamforming according to embodiments of the invention.

Reference is now made to FIG. 5, which illustrates a flow chart of a method 500 for performing 3D beamforming according to embodiments of the invention. Method 500 may be considered as an embodiment of method 400 described above with reference to FIG. 4. In the following description of method 500, optionally, mapped horizontal reference signals are optionally received from the BS and channel quality measure may be optionally obtained mapped horizontal reference signals. However, it is noted that this is only for the purpose of illustrating the principles of the present invention, rather than limiting the scope thereof.

At step S501, mapped vertical reference signals and mapped horizontal reference signals are received from a base station.

The mapped vertical reference signals correspond to those discussed in step S202 in method 200 and step S303 in method 300 as described above. The mapped horizontal reference signals correspond to those discussed in step S303 in method 300 as described above. Similar to the mapped vertical reference signals and the mapped horizontal reference signals discussed in method 200 or 300, the mapped vertical reference signals may be obtained during the mapping of vertical virtual antenna ports to physical antenna ports based on vertical reference signals, and the mapped horizontal reference signals may be obtained during the mapping of horizontal virtual antenna ports to physical antenna ports based on horizontal reference signals.

At step S502, vertical channel information is obtained based on the mapped vertical reference signals.

In accordance with embodiments of the present invention, the vertical reference signals (denoted as $a_V^{(p)}(0)$, $a_V^{(p)}(1), \ldots, a_V^{(p)}(N_V-1)$, p=0, 1, . . . , P−1) and/or horizontal reference signals (denoted as $a_H^{(q)}(0)$, $a_H^{(q)}(1), \ldots, a_H^{(q)}(N_H-1)$, q=0, 1, . . . , Q−1) are the same for both the UE and the BS. That is to say, both of the UE and the BS know and use the same vertical reference signals and/or the same horizontal reference signals during the 3D beamforming. The vertical reference signals and/or horizontal reference signals may be may be stored in a memory or a storage device accessible to the BS and the UE, for example, a semiconductor memory device, such as, RAM, ROM, EPROM, EEPROM, flash memory device, etc.

Although the UE have received the mapped vertical reference signals at step S501, the UE does not know the mapped vertical reference signals are mapping results of vertical VAPs to APs, but only knows that the received mapped vertical reference signals are results of modulation and transmission of the vertical reference signals, so the UE may estimate the channel information from the received RSs by using the vertical reference signals. The received RSs (e.g., the mapped vertical reference signals) may comprise P reference signal sequences, as indicated by equation (1).

Based on the mapped vertical reference signals and the known vertical reference signals, the vertical channel information may be obtained. The vertical channel information may be estimated in many available pilot aided channel estimation algorithms, e.g., the least square (LS) estimation, the minimum mean square error (MMSE) estimation, etc. In embodiments of the present invention, assuming the number of antenna ports at the UE is $N_r$, the vertical channel information may be obtained as a $N_r$-by-P channel matrix, denoted as $\hat{H}_V$, which is associated with the vertical reference signals $a_V^{(p)}(0)$, $a_V^{(p)}(1), \ldots, a_V^{(p)}(N_V-1)$, p=0, 1, . . . , P−1.

At step S503, a tilting vector is determined based on the vertical channel information.

As discussed above, the vertical channel information may be obtained as a channel matrix. In some embodiments of the present invention, the tilting vector may be the principal right singular vector of the channel matrix.

Then, the UE may select from a predetermined tilting codebook a codeword which matches the tilting vector and determine the index of the selected codeword as a tilting indicator. The predetermined tilting codebook is a codebook which describes the vertical tilting direction. Denote the predetermined tilting codebook as $F=\{f_V^{(i)}:i=0, 1, \ldots, 2^{B_{TI}}-1\}$, where $B_{TI}$ is the number of bits used for the tilting indicator and $f_V$ is a codeword is the tilting codebook. The criteria for selecting the codeword which matches the tilting vector may be given by $$TI = \underset{i=0,1,\ldots 2^{B_{TI}}-1}{\operatorname{argmin}} \mu(f_V^{(i)}; \hat{H}_V), \quad (6)$$

where TI stands for the tilting indicator; $\mu(f_V^{(i)};\hat{H}_V)$ is the measure of the "goodness" of the ith codeword given the channel matrix $\hat{H}_V$. An example of the measure is $$\mu(f_V^{(i)};\hat{H}_V)=|u*(\hat{H}_V)f_V^{(i)}|, \quad (7)$$

where $u(\hat{H}_V)$ denotes the principal right singular vector of the vertical channel matrix $\hat{H}_V$; u* denotes the conjugate transposition of u.

At step S504, the tilting indicator indicating the tilting vector is sent to the base station.

In embodiments of the present invention, the tilting indicator may be reported from the UE to the BS periodically or aperiodically via uplink control channels, e.g., Physical Uplink Control Channel (PUCCH) or Physical Uplink Shared Channel (PUSCH) in LTE or LTE-Advanced.

At step S505, horizontal channel information is obtained based on the mapped horizontal reference signals.

Similar to the obtaining process of the vertical channel information, the horizontal channel information may be obtained based on the mapped horizontal reference signals in view of the horizontal reference signals, which are the same as those used in mapping horizontal virtual antenna ports to physical antenna ports at the base station. The horizontal channel information may be also estimated in many available pilot aided channel estimation algorithms, e.g., LS estimation, MMSE estimation, etc.

At step S506, a channel quality measure is determined based on the horizontal channel information.

In accordance with embodiments of the present invention, the channel information may comprise information of a channel. As discussed above, the channel quality measure may indicate quality of the channel between the base station and the user equipment. The channel quality measure of the channel may be obtained based on the horizontal channel information in many ways available for the skilled in the art. In particular, the channel quality measure, such as a SNR, a SINR, a SNDR, and so forth of the channel may be determined from the horizontal channel information. It is noted that the determination of the channel quality measure may be implemented in existing means, thus its details are omitted.

At step S507, a channel quality indicator indicating the channel quality measure is sent to the base station.

According to some embodiments of the present invention, the channel quality indicator may indicate the channel quality measure, such as SINR, SNR, SNDR, etc. associated with one channel between the BS and the UE. For the communications system employing spatial multiplexing, the channel quality measure may be denoted as $\gamma_k$ which indicates the SINR associated with the kth channel.

According to some other embodiments of the present invention, the channel quality indicator may indicate a channel quality measure which has been adjusted by the tilting vector at the UE. In some embodiments, the UE may receive predefined horizontal virtualization weights from the base station, calculate a candidate channel quality measure (denoted as $\gamma_k'$) based on the predefined horizontal virtualization weights, the channel quality measure and the tilting vector, and update the channel quality measure $\gamma_k$ with the candidate channel quality measure $\gamma_k'$. In such embodiments, the channel quality indicator indicates channel quality measure $\gamma_k'$, rather than $\gamma_k$.

Figure 6:
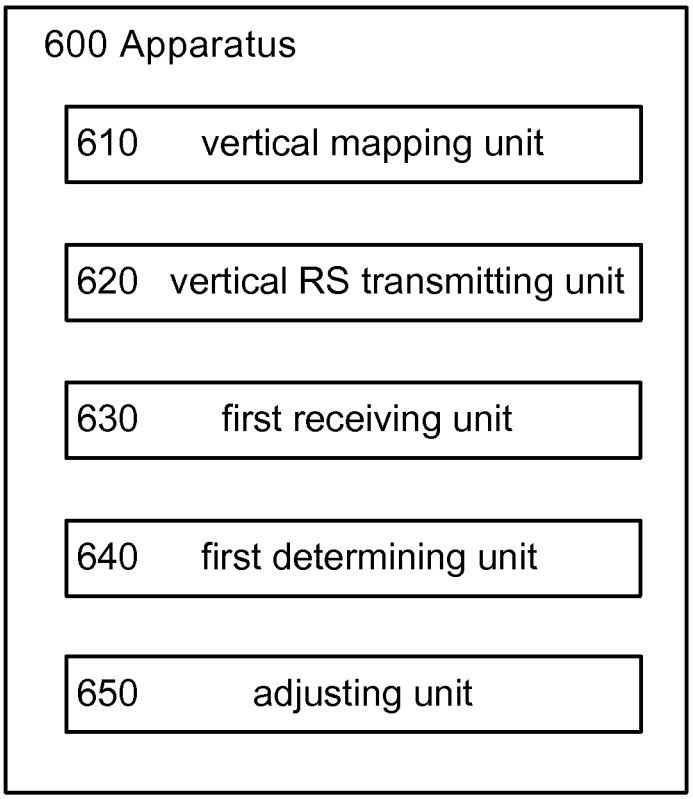
FIG. 6 illustrates a block diagram of an apparatus 600 for performing 3D beamforming according to embodiments of the invention.

Reference is now made to FIG. 6, which illustrates a block diagram of an apparatus 600 for performing 3D beamforming according to embodiments of the invention. In accordance with embodiments of the present invention, the apparatus 600 may be implemented in, for example, a transmitter, a base station, a base station controller (BSC), a gateway, a relay, a server, or any other applicable device.

As shown, the apparatus 600 comprises: vertical mapping unit 610 configured to map vertical virtual antenna ports to physical antenna ports based on vertical reference signals (RS) to obtain mapped vertical reference signals; vertical RS transmitting unit 620 configured to transmit the mapped vertical reference signals to a user equipment; first receiving unit 630 configured to receive a tilting indicator from the user equipment, wherein the tilting indicator is obtained based on the mapped vertical reference signals at the user equipment; first determining unit 640 configured to determine a tilting vector based on the received tilting indicator, wherein the tilting vector indicates adjustment for traffic data in antenna vertical tilting; and adjusting unit 650 configured to adjusting traffic data with the tilting vector.

In accordance with embodiments of the present invention, the vertical mapping unit 610 may comprise: first obtaining unit configured to obtain the mapped vertical reference signals based on the vertical reference signals and predefined vertical virtualization weight.

In accordance with embodiments of the present invention, the vertical virtualization weights may be selected such that the half-power beam width of each vertical virtual antenna port is maximized.

In accordance with embodiments of the present invention, the apparatus 600 may further comprise: horizontal mapping unit configured to map mapping horizontal virtual antenna ports to physical antenna ports based on horizontal reference signals to obtain mapped horizontal reference signals; and horizontal RS transmitting unit configured to transmit transmitting the mapped horizontal reference signals to a user equipment.

In accordance with embodiments of the present invention, wherein transmission of the mapped vertical reference signals may be in orthogonal to transmission of the mapped horizontal reference signals, wherein the transmissions of the mapped vertical reference signals corresponding to respective vertical virtual antenna ports may be orthogonal, and wherein the transmissions of the mapped horizontal reference signals corresponding to respective horizontal virtual antenna ports may be orthogonal.

In accordance with embodiments of the present invention, the apparatus 600 may further comprise: second receiving unit configured to receive a channel quality indicator from the user equipment; second obtaining unit configured to obtain a channel quality measure based on the received channel quality indicator; and selecting unit configured to select a modulation and coding scheme for traffic data transmission based on the channel quality measure. In accordance with embodiments of the present invention, the selecting unit may comprise: calculating unit configured to calculate a candidate channel quality measure based on the predefined horizontal virtualization weights, the obtained channel quality measure and the tilting vector; updating unit configured to update the channel quality measure with the candidate channel quality measure; and second determining unit configured to determine a modulation and coding scheme for traffic data transmission based on the updated channel quality measure.

Figure 7:
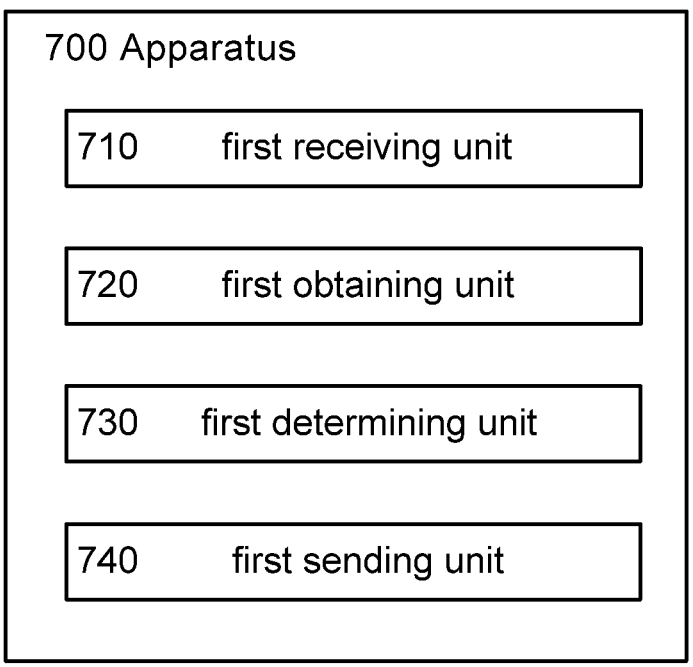
FIG. 7 illustrates a block diagram of an apparatus 700 for performing 3D beamforming according to embodiments of the invention.

Reference is now made to FIG. 7, which illustrates a block diagram of an apparatus 700 for performing 3D beamforming according to embodiments of the invention. In accordance with embodiments of the present invention, the apparatus 700 may be implemented in, for example, a receiver, a user equipment, a terminal or any other applicable device.

As shown, the apparatus 700 comprises: first receiving unit 710 configured to receive mapped vertical reference signals (RSs) from a base station; first obtaining unit 720 configured to obtain vertical channel information based on the mapped vertical reference signals; first determining unit 730 configured to determine a tilting vector based on the vertical channel information, wherein the tilting vector indicates adjustment for traffic data in antenna vertical tilting; and first sending unit 740 configured to send the tilting indicator indicating the tilting vector to the base station.

In accordance with embodiments of the present invention, the first obtaining unit 720 may comprise: vertical RS obtaining unit configured to obtain vertical reference signals, which are the same as those used in mapping vertical virtual antenna ports to physical antenna ports at the base station; and estimating unit configured to estimate the vertical channel information based on the mapped vertical reference signals and the vertical reference signals.

In accordance with embodiments of the present invention, the apparatus 700 may further comprise: second receiving unit configured to receive mapped horizontal reference signals from the base station; second obtaining unit configured to obtain horizontal channel information based on the mapped horizontal reference signals; second determining unit configured to determine a channel quality measure based on the horizontal channel information, wherein the channel quality measure indicates quality of the channel between the base station and the user equipment; and second sending a channel quality indicator indicating the channel quality measure to the base station.

In accordance with embodiments of the present invention, the second determining unit may comprise: third receiving unit configured to receive predefined horizontal virtualization weights from the base station; calculating unit configured to calculate a candidate channel quality measure based on the predefined horizontal virtualization weights, the obtained channel quality measure and the tilting vector; and updating unit configured to update the channel quality measure with the candidate channel quality measure.

Figure 8:
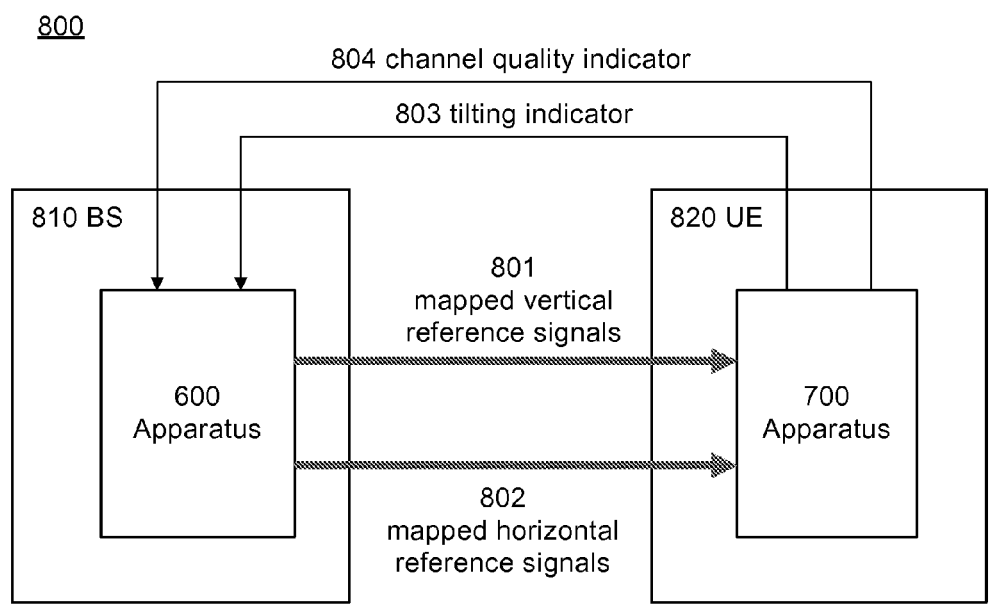
FIG. 8 illustrates a block diagram of a communication system 800 in which 3D beamforming is performed according to embodiments of the invention.

Reference is now made to FIG. 8, which illustrates a block diagram of a communication system 800 in which 3D beamforming is performed according to embodiments of the invention. As shown, the system 800 comprises a BS 810 and a UE 820. The BS 810 comprises the apparatus 600 and the UE 820 comprises the apparatus 700. At the BS 810, vertical virtual antenna ports may be mapped to physical antenna ports based on vertical reference signals to obtain mapped vertical reference signals; the mapped vertical reference signals 801 may be transmitted to the UE 820; then, a tilting indicator 803 may be received at the BS 810 from the UE 820, wherein the tilting indicator 830 may be obtained based on the mapped vertical reference signals at the user equipment; next, a tilting vector may be determined at the BS 810 based on the received tilting indicator 803 and traffic data to be transmitted from the BS 810 to the UE 820 may be adjusted by the tilting vector. In further embodiments of the present invention, horizontal virtual antenna ports may also be mapped to physical antenna ports based on horizontal reference signals to obtain mapped horizontal reference signals; and the mapped horizontal reference signals 802 may be transmitted to the UE 820. The UE 820 may obtain a channel quality measure based on the mapped horizontal reference signals 802 and sent to the BS 810 a channel quality indicator 804 which indicates the channel quality measure.

It is also to be noted that the vertical mapping unit 610, the vertical RS transmitting unit 620, first receiving unit 630, the first determining unit 640, the adjusting unit 650 may be respectively implemented by any suitable technique either known at present or developed in the future. Meanwhile, the first receiving unit 710, the first obtaining unit 720, the first determining unit 730 and the first sending unit 740 may also be respectively implemented by any suitable technique either known at present or developed in the future. Further, a single device shown in FIG. 6 or FIG. 7 may be alternatively implemented in multiple devices separately, and multiple separated devices may be implemented in a single device. The scope of the present invention is not limited in these regards.

It is noted that the apparatus 600 may be configured to implement functionalities as described with reference to FIGS. 2 and 3, and the apparatus 700 may be configured to implement functionalities as described with reference to FIGS. 4 and 5. Therefore, the features discussed with respect to any of methods 200 and 300 may apply to the corresponding components of the apparatus 600, and the features discussed with respect to the method 400 and 500 may apply to the corresponding components of the apparatus 700. It is further noted that the components of the apparatus 600 or the apparatus 700 may be embodied in hardware, software, firmware, and/or any combination thereof. For example, the components of the apparatus 600 or the apparatus 700 may be respectively implemented by a circuit, a processor or any other appropriate device. Those skilled in the art will appreciate that the aforesaid examples are only for illustration not limitation.

In some embodiment of the present disclosure, the apparatus 600 or the apparatus 700 may comprise at least one processor. The at least one processor suitable for use with embodiments of the present disclosure may include, by way of example, both general and special purpose processors already known or developed in the future. The apparatus 600 or the apparatus 700 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 600 to at least perform according to any of methods 200 and 300 as discussed above, or to cause the apparatus 700 to at least perform according to methods 400 and 500 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 2-5 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method for three-dimensional (3D) beamforming, comprising:
    mapping vertical virtual antenna ports to physical antenna ports based on vertical reference signals (RSs) to obtain mapped vertical reference signals;
    transmitting the mapped vertical reference signals to a user equipment;
    receiving a tilting indicator from the user equipment, wherein the tilting indicator is obtained based on the mapped vertical reference signals at the user equipment;
    determining a tilting vector based on the received tilting indicator, wherein the tilting vector indicates adjustment for traffic data in antenna vertical tilting; and
    adjusting traffic data with the tilting vector.

2. The method of claim 1, wherein mapping vertical virtual antenna ports to physical antenna ports based on vertical reference signals to obtain mapped vertical reference signals comprises:
    obtaining the mapped vertical reference signals based on the vertical reference signals and predefined vertical virtualization weight.

3. The method of claim 2, wherein the vertical virtualization weights are selected such that the half-power beam width of each vertical virtual antenna port is maximized.

4. The method of claim 1, further comprising:
    mapping horizontal virtual antenna ports to physical antenna ports based on horizontal reference signals to obtain mapped horizontal reference signals; and
    transmitting the mapped horizontal reference signals to a user equipment.

5. The method of claim 4, wherein transmission of the mapped vertical reference signals is in orthogonal to transmission of the mapped horizontal reference signals, wherein the transmissions of the mapped vertical reference signals corresponding to respective vertical virtual antenna ports are orthogonal, and wherein the transmissions of the mapped horizontal reference signals corresponding to respective horizontal virtual antenna ports are orthogonal.

6. The method of claim 1, further comprising:
    receiving a channel quality indicator from the user equipment;
    obtaining a channel quality measure based on the received channel quality indicator; and
    selecting a modulation and coding scheme for traffic data transmission based on the channel quality measure.

7. The method of claim 6, wherein selecting a modulation and coding scheme for traffic data transmission based on the channel quality measure comprises:
    calculating a candidate channel quality measure based on the predefined horizontal virtualization weights, the obtained channel quality measure and the tilting vector;
    updating the channel quality measure with the candidate channel quality measure; and
    determining a modulation and coding scheme for traffic data transmission based on the updated channel quality measure.

8. An apparatus for three-dimensional (3D) beamforming, comprising:
    vertical mapping unit configured to map vertical virtual antenna ports to physical antenna ports based on vertical reference signals (RS) to obtain mapped vertical reference signals;
    vertical RS transmitting unit configured to transmit the mapped vertical reference signals to a user equipment;
    first receiving unit configured to receive a tilting indicator from the user equipment, wherein the tilting indicator is obtained based on the mapped vertical reference signals at the user equipment;
    first determining unit configured to determine a tilting vector based on the received tilting indicator, wherein the tilting vector indicates adjustment for traffic data in antenna vertical tilting; and
    adjusting unit configured to adjusting traffic data with the tilting vector.

9. The apparatus of claim 8, wherein the vertical mapping unit comprises:
    first obtaining unit configured to obtain the mapped vertical reference signals based on the vertical reference signals and predefined vertical virtualization weight.

10. The apparatus of claim 9, wherein the vertical virtualization weights are selected such that the half-power beam width of each vertical virtual antenna port is maximized.

11. The apparatus of claim 8, further comprising:
    horizontal mapping unit configured to map mapping horizontal virtual antenna ports to physical antenna ports based on horizontal reference signals to obtain mapped horizontal reference signals; and
    horizontal RS transmitting unit configured to transmit transmitting the mapped horizontal reference signals to a user equipment.

12. The apparatus of claim 11, wherein transmission of the mapped vertical reference signals is in orthogonal to transmission of the mapped horizontal reference signals, wherein the transmissions of the mapped vertical reference signals corresponding to respective vertical virtual antenna ports are orthogonal, and wherein the transmissions of the mapped horizontal reference signals corresponding to respective horizontal virtual antenna ports are orthogonal.

13. The apparatus of claim 8, further comprising:
    second receiving unit configured to receive a channel quality indicator from the user equipment;
    second obtaining unit configured to obtain a channel quality measure based on the received channel quality indicator; and
    selecting unit configured to select a modulation and coding scheme for traffic data transmission based on the channel quality measure.

14. The apparatus of claim 13, wherein the selecting unit comprises:
    calculating unit configured to calculate a candidate channel quality measure based on the predefined horizontal virtualization weights, the obtained channel quality measure and the tilting vector;

updating unit configured to update the channel quality measure with the candidate channel quality measure; and second determining unit configured to determine a modulation and coding scheme for traffic data transmission based on the updated channel quality measure.

\* \* \* \* \*